United States Patent
Koyama

(10) Patent No.: US 7,289,265 B2
(45) Date of Patent: Oct. 30, 2007

(54) MICROSCOPE ILLUMINATION INTENSITY MEASURING DEVICE

(75) Inventor: Kenichi Koyama, Sagamihara (JP)

(73) Assignee: Olympus Corporation, Tokyo (JP)

( * ) Notice: Subject to any disclaimer, the term of this patent is extended or adjusted under 35 U.S.C. 154(b) by 137 days.

(21) Appl. No.: 11/146,999

(22) Filed: Jun. 7, 2005

(65) Prior Publication Data
US 2005/0275938 A1    Dec. 15, 2005

(30) Foreign Application Priority Data
Jun. 10, 2004   (JP)   ............... 2004-172576

(51) Int. Cl.
G02B 21/06   (2006.01)
(52) U.S. Cl. ...................... 359/385; 359/381
(58) Field of Classification Search ............... 359/385, 359/381
See application file for complete search history.

(56) References Cited

U.S. PATENT DOCUMENTS

| | | | |
|---|---|---|---|
| 4,555,620 A | 11/1985 | Bridson et al. | |
| 6,185,030 B1 | 2/2001 | Overbeck | |
| 6,201,639 B1 | 3/2001 | Overbeck | |
| 6,262,838 B1 | 7/2001 | Montagu | |
| 6,269,846 B1 | 8/2001 | Overbeck et al. | |
| 6,335,824 B1 | 1/2002 | Overbeck | |
| 2002/0154396 A1 | 10/2002 | Overbeck | |
| 2002/0196536 A1 | 12/2002 | Ott | |
| 2004/0126895 A1 | 7/2004 | Overbeck et al. | |
| 2005/0117210 A1 | 6/2005 | Ott | |

FOREIGN PATENT DOCUMENTS

| | | |
|---|---|---|
| DE | 101 42 945 A1 | 4/2003 |
| EP | 1 237 029 A2 | 9/2002 |
| JP | 5-297280 A | 11/1993 |

*Primary Examiner*—Joshua L Pritchett
(74) *Attorney, Agent, or Firm*—Frishauf, Holtz, Goodman & Chick, P.C.

(57) ABSTRACT

A microscope illumination intensity measuring device has a light-receiving unit that outputs a signal representing an intensity of received light, a moving mechanism that places the light-receiving unit on an observation optical axis of the microscope as needed, a converter that converts a signal output from the light-receiving unit into light intensity information, a wavelength selection unit that sets a wavelength for light to be measured, and a display unit that displays the light intensity information.

12 Claims, 4 Drawing Sheets

MICROSCOPE ILLUMINATION INTENSITY MEASURING DEVICE

CROSS-REFERENCE TO RELATED APPLICATIONS

This application is based upon and claims the benefit of priority from prior Japanese Patent Application No. 2004-172576, filed Jun. 10, 2004, the entire contents of which are incorporated herein by reference.

BACKGROUND OF THE INVENTION

1. Field of the Invention

The present invention relates to a microscope illumination intensity measuring device, which measures the intensity of illumination light for a microscope.

2. Description of the Related Art

Recently, with the discovery of fluorescent proteins and subsequent refinements, studies targeted on living cells have been vigorously conducted. As a first step for the functional analysis of living organisms, which is the final purpose, for example, a technique is employed, which includes acquiring images by visualizing phenomena such as the appearance of genes in living cells by using fluorescent observation with microscopes or measuring the phenomena.

In fluorescent observation, a fluorescent protein is excited by light with a specific wavelength (excitation light), and the resultant fluorescence is observed. In this observation, special light different from that applied to a cell in a cultured state must be applied to the cell.

In studies targeted on living cells, in order to improve the reliability of an experiment, it is important not to cause any damage to the cell under observation. That is, in order to minimize damage to a cell, it is important to minimize the intensity of excitation light at the time of fluorescent observation. In addition, in order to improve the reliability (repeatability) of the experiment, it is important to keep the intensity of excitation light constant.

Jpn. Pat. Appln. KOKAI Publication No. 5-297280 discloses a technique of measuring brightness at the time of microscope observation. This technique is associated with a microscope that uses, as an illumination light source, a CRT illumination placed at a position almost conjugate to a specimen. In this case, an observation image is sensed by a CCD or the like, and an intensity distribution is calculated by image processing, thereby controlling the CRT illumination to keep the contrast at each portion of the specimen constant on the basis of the intensity distribution.

BRIEF SUMMARY OF THE INVENTION

According to the present invention, a microscope illumination intensity measuring device, which measures the intensity of illumination light (excitation light), comprises a light-receiving unit that outputs a signal representing an intensity of received light, a moving mechanism that places the light-receiving unit on an observation optical axis of the microscope as needed, a converter that converts a signal output from the light-receiving unit into light intensity information, a wavelength selection unit that sets a wavelength for light to be measured, and a display unit that displays the light intensity information.

Another microscope illumination intensity measuring device according to the present invention comprises a light-receiving unit that outputs a signal representing an intensity of received light, a moving mechanism that places the light-receiving unit at a position to which light from the illumination optical system of the microscope can be applied as needed, a converter that converts a signal output from the light-receiving unit into light intensity information, a wavelength selection unit that sets a wavelength for light to be measured, and a display unit that displays the light intensity information.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The embodiments of the present invention will be described below with reference to the views of the accompanying drawing.

Figure 1:
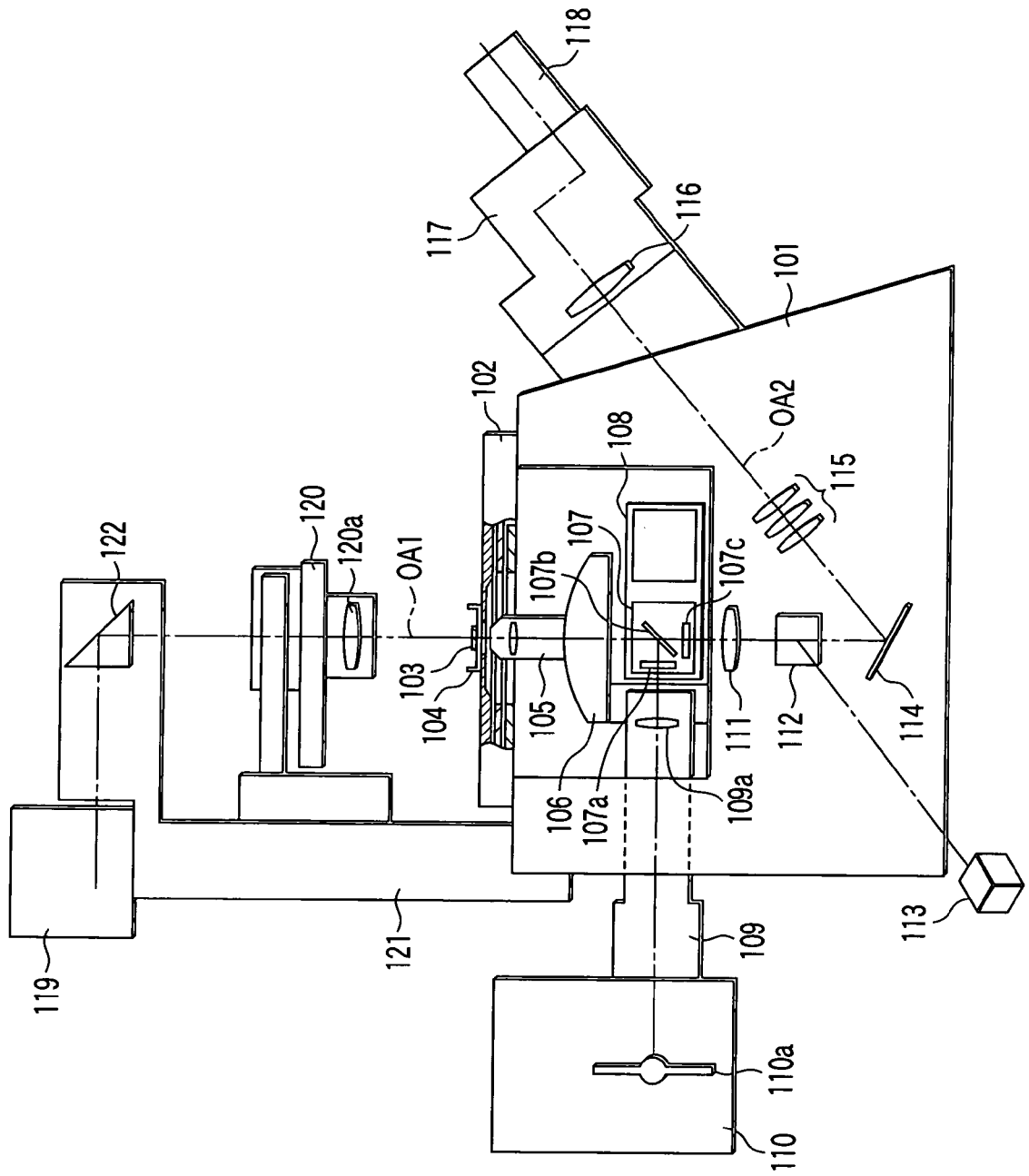
FIG. 1 is a view schematically showing the arrangement of a general fluorescence microscope.

Prior to the description of the embodiments, a general fluorescence microscope, to which the present invention is applied, will be described with reference to FIG. 1. FIG. 1 schematically shows the arrangement of a general fluorescence microscope.

As shown in FIG. 1, a stage 102 is fixed to a microscope body 101. The stage 102 holds a vessel 104 containing a specimen to be observed, i.e., a living cell 103, and can move the living cell 103 in a plane perpendicular to an observation optical axis OA1.

A revolver 106 is placed below the stage 102 so as to be movable along the observation optical axis OA1. The revolver 106 can hold objective lenses 105, and can selectively place one of the held objective lenses 105 on the observation optical axis OA1.

A fluorescence turret 108 is placed below the revolver 106. The fluorescence turret 108 can hold mirror units 107 and selectively place one of the held mirror units 107 on the observation optical axis OA1. Each mirror unit 107 has an excitation filter 107a, dichroic mirror 107b, and absorption filter 107c.

An incident-light fluorescence illuminator 109 and lamp house 110 are arranged on a side of the fluorescence turret 108. The lamp house 110 is mounted on the microscope body 101 through the incident-light fluorescence illuminator 109. The lamp house 110 has a light source 110a such as an arc discharge type light source. The incident-light fluorescence illuminator 109 has a lens 109a. The lamp house 110 and incident-light fluorescence illuminator 109 constitute an illumination optical system that illuminates the living cell 103 with excitation light, in cooperation with the mirror unit 107 and objective lens 105 arranged on the observation optical axis OA1. The illumination optical axis of the illumination optical system is coupled to the observation optical axis OA1 through the dichroic mirror 107b in the mirror unit 107 placed on the observation optical axis OA1.

An imaging lens 111 constituting an imaging optical system in cooperation with the objective lens 105 is placed on the observation optical axis OA1 below the mirror unit 107, together with a prism 112 for reflecting observation light to a CCD camera 113.

A reflecting mirror 114 for bending the observation optical axis OA1 in a V shape is placed below the prism 112. A relay lens 115 and second imaging lens 116 are arranged on an observation axis OA2 bent by the reflecting mirror 114. The second imaging lens 116 is provided in a lens barrel 117 mounted on the microscope body 101. An eyepiece 118 is detachably mounted in the lens barrel 117.

A lamp house 119, reflecting element 122, and condenser 120 are mounted on a column 121 fixed to the microscope body 101. The condenser 120 is positioned above the stage 102 and has at least one lens. The lamp house 119 emits light for illuminating the living cell 103. The reflecting element 122 reflects light from the lamp house 119 downward. The condenser 120 projects light from the reflecting element 122 onto the living cell 103.

Fluorescent observation with the fluorescence microscope in FIG. 1 will be described next.

The light emitted from the light source 110a is guided to the mirror unit 107 through the incident-light fluorescence illuminator 109. Only necessary excitation light is extracted from this light by the excitation filter 107a in the mirror unit 107. The excitation light is reflected by the dichroic mirror 107b and illuminates the living cell 103 through the objective lens 105.

The living cell 103 excited by the excitation light emits fluorescence. The fluorescence passes through the objective lens 105 and dichroic mirror 107b. The fluorescence is guided to the imaging lens 111 after unnecessary light is removed from the fluorescence by the absorption filter 107c.

In visual observation, the fluorescence condensed by the imaging lens 111 passes through the prism 112, and the direction of the fluorescence is changed to the observation axis OA2 by the reflecting mirror 114. The fluorescence then passes through the relay lens 115 and second imaging lens 116 and observed through the eyepiece 118.

When image sensing is performed by the CCD camera 113, the fluorescence condensed by the imaging lens 111 is reflected in a direction different from that of the observation optical axis OA1 by the prism 112 and guided to the CCD camera 113 mounted on the microscope body 101 to be sensed.

The observation magnification is changed by switching the objective lens 105 located on the observation optical axis OA1 to another objective lens.

Excitation light is changed by switching the mirror unit 107 located on the observation optical axis OA1 to another mirror unit by the fluorescence turret 108.

The observation position of the living cell 103 is changed by moving the stage 102 in a plane perpendicular to the observation optical axis OA1 by using a stage handle (not shown) or motor-driven control unit (not shown).

In the case of observation with transmitted illumination, the illumination light emitted from the lamp house 119 is reflected downward by the reflecting element 122, passes through the condenser 120, and illuminates the living cell 103 from the opposite side to the objective lens 105.

The observation light that has passed through the living cell 103 is guided to the objective lens 105 to be visually observed or sensed as in the case of fluorescent observation.

FIRST EMBODIMENT

Figure 2:
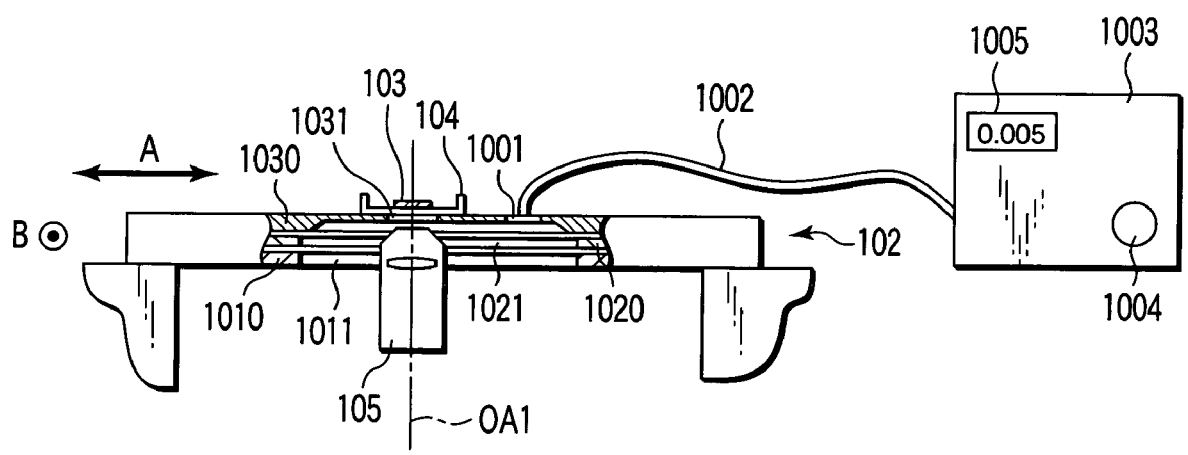
FIG. 2 is a view showing an illumination intensity measuring device according to the first embodiment of the present invention, together with the cross-sectional structure of a stage.

An illumination intensity measuring device according to the first embodiment of the present invention will be described below. A description of the overall fluorescence microscope, which has been described with reference FIG. 1, will be omitted, and only a portion directly associated with the illumination intensity measuring device will be described below. FIG. 2 shows the illumination intensity measuring device according to the first embodiment of the present invention, together with a cross-sectional structure of a stage.

As shown in FIG. 2, a stage 102 comprises a lower stage 1010 fixed to a microscope body 101 with screws or the like (not shown), a middle stage 1020 that is held so as to be movable in a direction A in FIG. 2 with respect to the lower stage 1010, and an upper stage 1030 that is held so as to be movable in a direction B in FIG. 2 with respect to the middle stage 1020. A vessel 104 containing a living cell 103 is held on the upper surface of the upper stage 1030. Holes 1011, 1021, and 1031 through which light passes are formed in the stages 1010, 1020, and 1030, respectively.

The illumination intensity measuring device comprises a light-receiving unit 1001 that outputs a signal representing the intensity of received light and a converter 1003 that converts the signal output from the light-receiving unit 1001 into light intensity information. For example, the light-receiving unit 1001 is formed from a photodiode, although not limited to this. The light-receiving unit 1001 is connected to the converter 1003 through a detachable cable 1002. The converter 1003 comprises a wavelength selection unit 1004, which is, for example, of a dial type, for setting a wavelength for light to be measured and a display unit 1005 for displaying a light intensity.

The light-receiving unit 1001 is fixed to a part of the upper stage 1030 that is near the position where the vessel 104 is placed and, to be precise, a part of the upper stage 1030 that can be placed on an observation optical axis OA1. This allows the light-receiving unit 1001 to be placed on the observation optical axis OA1 as needed. In other words, the stage 102 constitutes a moving mechanism that places the light-receiving unit 1001 on the observation optical axis OA1 of the microscope as needed.

The function of the illumination intensity measuring device according to this embodiment will be described next.

In normal fluorescent observation, as described above, excitation light is applied to the living cell 103 through an objective lens 105 to allow fluorescent observation.

When an excitation light intensity is to be measured in this state, first of all, an excitation wavelength to be used is set by the wavelength selection unit 1004 is set. The stage 102 is then driven by using a stage handle (not shown) or the like to place the light-receiving unit 1001 on the observation optical axis OA1.

As a consequence, the excitation light exiting from the objective lens 105 strikes the light-receiving unit 1001. The light-receiving unit 1001 outputs an analog signal representing the intensity of the received excitation light. The analog signal is guided to the converter 1003 through the cable 1002. The converter 1003 calculates a light intensity by processing the analog signal on the basis of the wavelength selected by the wavelength selection unit 1004, and displays the calculation result on the display unit 1005.

This makes it possible for an observer to check the intensity of excitation light in the form of a numerical value. In addition, based on this value, an illumination intensity can be reproduced by using a light control filter (not shown) or the like. This makes it possible to assemble an experimental system with high reproducibility.

As shown in FIG. 2, in the first embodiment, the light-receiving unit 1001 is placed on the observation optical axis OA1. However, a similar effect can be obtained by the following arrangement and function.

Referring to FIG. 2, a reflecting member such as a mirror (not shown) may be provided on the upper stage 1030 at an angle of 45° with respect to the observation optical axis OA1, and the light-receiving unit 1001 may be placed at a position where it can receive excitation light that is reflected by the reflecting member and is perpendicular to the observation optical axis OA1.

In this case, when the stage 102 is driven to place the reflecting member on the observation optical axis OA1, the excitation light reflected by the reflecting member strikes the light-receiving unit 1001, thereby displaying the excitation light intensity on the display unit 1005.

In this case, the angle of the reflecting member with respect to the observation optical axis OA1 is set to 45°. However, a similar effect can be obtained even if this angle is changed.

(First Modification)

Figure 3:
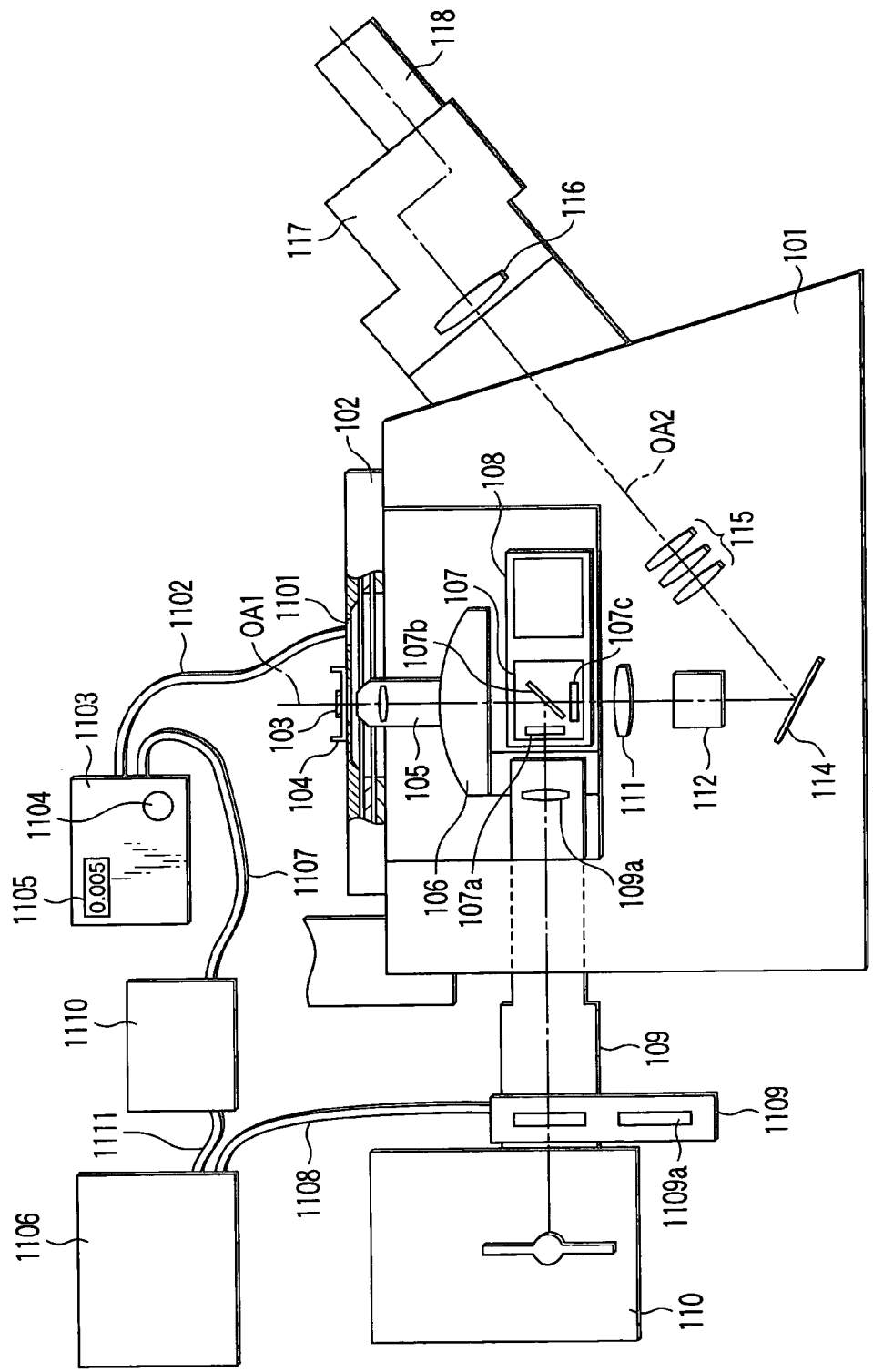
FIG. 3 is a view showing an overall fluorescence microscope including an illumination intensity measuring device according to the first modification of the first embodiment of the present invention.

FIG. 3 shows an overall fluorescence microscope comprising an illumination intensity measuring device according to the first modification of the first embodiment of the present invention.

In this modification, an illumination optical system that illuminates the living cell 103 with excitation light has a motor-driven light control unit. That is, a motor-driven filter wheel 1109 serving as a light control unit is provided between an incident-light fluorescence illuminator 109 and a lamp house 110. The motor-driven filter wheel 1109 holds a light control filters 1109a with different transmittances, and can selectively place one of them on the illumination light path.

The motor-driven filter wheel 1109 is connected to a light control unit 1106 through a cable 1108. The light control unit 1106 is connected to a PC (Personal Computer) 1110 through a communication cable 1111. The PC 1110 is connected to a converter 1103 through a communication cable 1107. The PC 1110 incorporates software for setting a target value for the intensity of excitation light and driving the light control unit 1106 in accordance with light intensity information from the converter 1103.

In this modification, first of all, a target value for the intensity of excitation light is set by the software in the PC 1110.

The light control unit 1106 controls the motor-driven filter wheel 1109 on the basis of the light intensity information obtained by the converter 1103 in accordance with the software in the PC 1110. If, for example, the light intensity information from the converter 1103 is smaller than the target value of excitation light intensity by a predetermined value or more (i.e., smaller than the lower limit value in the allowable range), the light control filters 1109a in the motor-driven filter wheel 1109 are switched to increase the transmittance. If the light intensity information from the converter 1103 is larger than the target value of excitation light intensity by a predetermined value or more (i.e., larger than the upper limit value in the allowable range), the light control filters 1109a in the motor-driven filter wheel 1109 are switched to decrease the transmittance.

With this operation, the excitation light intensity can be automatically adjusted to near the preset target value. This makes it possible to save labor as well as obtaining the same merits as those of the first embodiment.

In this modification, the light control device for excitation light uses the scheme of switching light control filters with different transmittances. However, a similar effect can be obtained even by using another scheme, e.g., a scheme of controlling the aperture stop of the illumination optical system.

At least one or all of the converter 1003, wavelength selection unit 1004, and display unit 1005 may be integrated with the PC 1110.

(Second Modification)

In the device arrangement of the first modification, the stage 102 is formed from a motor-driven stage, and the operation of the stage 102 is controlled by the software in the PC 1110.

In this modification, observation and excitation light intensity adjustment sequences can be formed in the PC. For this reason, light control can be performed by automatically measuring an excitation light intensity during observation. This makes it possible to automatically conduct a reproducible experiment while the excitation light intensity is kept constant.

SECOND EMBODIMENT

Figure 4:
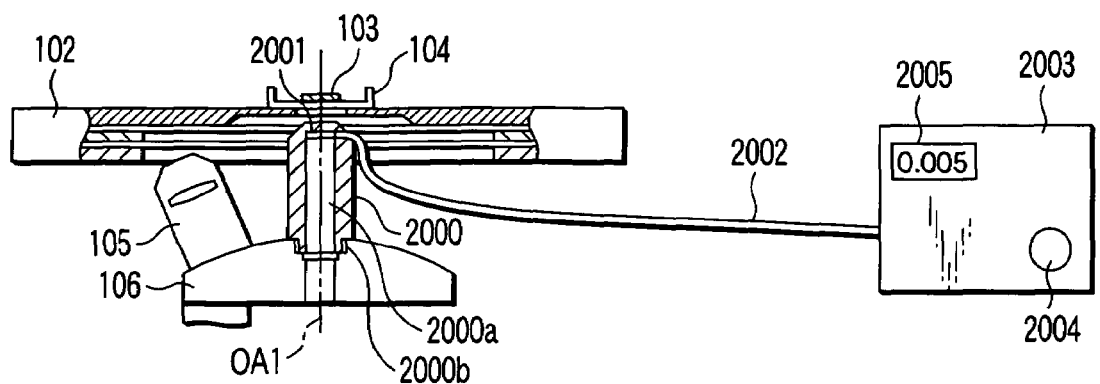
FIG. 4 is a view showing an illumination intensity measuring device according to the second embodiment of the present invention, together with an objective lens and revolver.

An illumination intensity measuring device according to the second embodiment of the present invention will be described below. As in the first embodiment, a description of the overall fluorescence microscope described above with reference FIG. 1 will be omitted, and only a portion directly associated with the illumination intensity measuring device will be described below. FIG. 4 shows the illumination intensity measuring device according to the second embodiment of the present invention, together with an objective lens and revolver.

As shown in FIG. 4, the illumination intensity measuring device has a detector 2000 detachably mounted on a revolver 106 like an objective lens 105. The detector 2000 has a mount screw 2000b that fits an objective lens mount portion provided for the revolver 106 and a hole 2000a. The detector 2000 has a light-receiving unit 2001 that outputs a signal representing the intensity of received light inside the hole 2000a at a position near its distal end portion. The light-receiving unit 2001 is formed from, for example, a photodiode, although not limited to this. The light-receiving unit 2001 can be placed on an observation optical axis OA1 as needed by rotating the revolver 106. In other words, the revolver 106 constitutes a moving mechanism that places the light-receiving unit 2001 on the observation optical axis OA1 of the microscope as needed.

The illumination intensity measuring device further comprises a converter 2003 that converts the signal output from the light-receiving unit 2001 into light intensity information. The light-receiving unit 2001 is connected to the converter 2003 through a cable 2002. The converter 2003 converts the signal output from the light-receiving unit 2001 into light intensity information. The converter 2003 comprises a wavelength selection unit 2004 of, for example, a dial type, which is used to set a wavelength for light to be measured, and a display unit 2005 for displaying a light intensity.

The function of the illumination intensity measuring device according to this embodiment will be described next.

In normal fluorescent observation, as described above, excitation light is applied from the objective lens 105 to a living cell 103, thereby allowing fluorescent observation.

When an excitation light intensity in this state is to be measured, first of all, an excitation wavelength to be used is set by the wavelength selection unit 2004. The revolver 106 is then operated to place the detector 2000 on an observation optical axis OA1.

As a consequence, the excitation light passes through the hole 2000a and strikes the light-receiving unit 2001. The light-receiving unit 2001 then outputs an analog signal representing the intensity of the received excitation light. The analog signal is guided to the converter 2003 through the cable 2002. The converter 2003 calculates a light intensity by processing the analog signal on the basis of the wavelength selected by the wavelength selection unit 2004, and displays the calculation result on the display unit 2005.

This allows the observer to obtain the same merits as those of the first embodiment.

As shown in FIG. 4, in the second embodiment, the light-receiving unit 2001 provided for the detector 2000 is placed on the observation optical axis OA1. However, a similar effect can be obtained by the following arrangement and function.

Referring to FIG. 4, a reflecting member such as a mirror (not shown) may be provided on the detector 2000 at an angle of 45° with respect to the observation optical axis OA1, and the light-receiving unit 2001 may be placed at a position where it can receive excitation light that is reflected by the reflecting member and is perpendicular to the observation optical axis OA1.

In this case, when the detector 2000 is placed on the observation optical axis OA1 by the revolver 106, the excitation light reflected by the reflecting member strikes the light-receiving unit 2001, thereby displaying the excitation light intensity on the display unit 2005.

In this case, the angle of the reflecting member with respect to the observation optical axis OA1 is set to 45°. However, a similar effect can be obtained even if this angle is changed.

Modifications of the second embodiment will be described below.

Since the modifications are basically the same as the first embodiment, they will be described without using any drawing.

(First Modification)

As in the first modification of the first embodiment, a light control device is combined with the illumination intensity measuring device. This makes it possible to obtain the same effects as those of the first modification of the first embodiment.

(Second Modification)

In the device arrangement according to the first modification of this embodiment, the revolver 106 is formed from a motor-driven revolver, and the operation of the revolver 106 is controlled by software in a PC. This makes it possible to obtain the same effects as those of the second modification of the first embodiment.

THIRD EMBODIMENT

Figure 5:
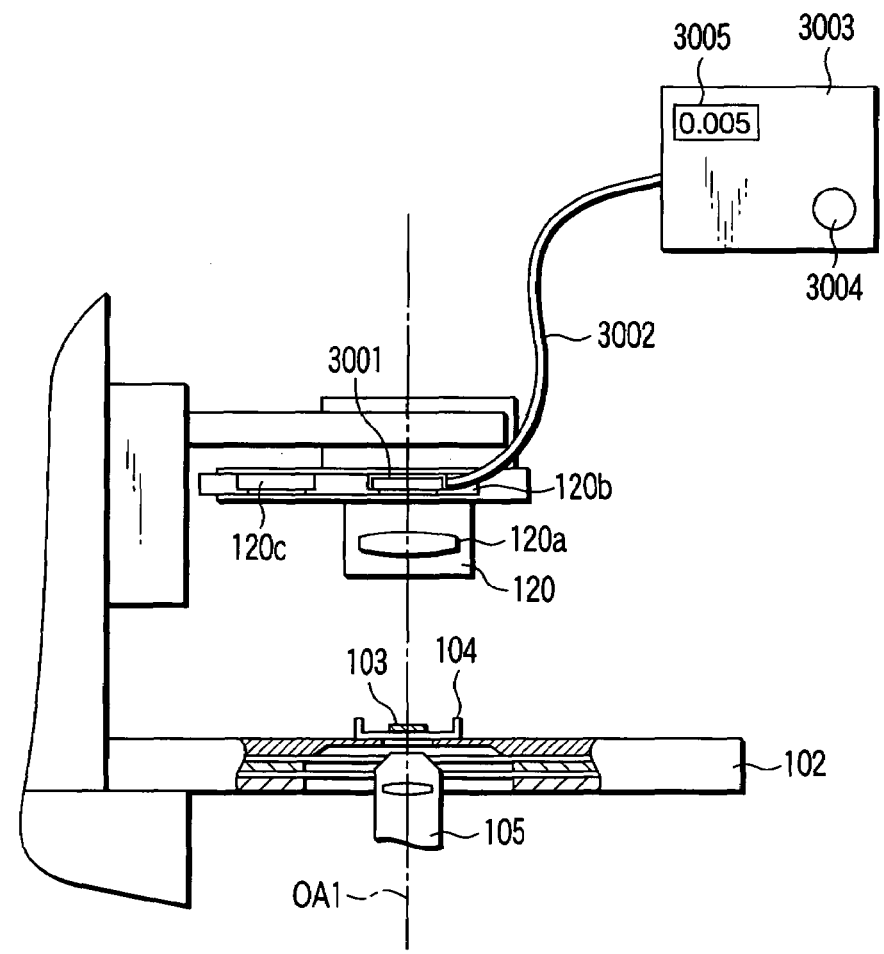
FIG. 5 is a view showing an illumination intensity measuring device according to the third embodiment of the present invention, together with a condenser.

An illumination intensity measuring device according to the third embodiment of the present invention will be described below. As in the first embodiment, a description of the overall fluorescence microscope described above with reference FIG. 1 will be omitted, and only a portion directly associated with the illumination intensity measuring device will be described below. FIG. 5 shows the illumination intensity measuring device according to the third embodiment of the present invention, together with a condenser.

As shown in FIG. 5, a condenser 120 comprises at least one lens 120a for properly adjusting illumination light from a lamp house 119, and also comprises, above the lenses 120a, a turret 120b having holding holes 120c for holding optical elements such as a differential interference optical element. The turret 120b can selectively place one of the optical elements held in the holding holes 120c on an observation optical axis OA1.

The illumination intensity measuring device comprises a light-receiving unit 3001 that outputs a signal representing the intensity of received light. The light-receiving unit 3001 is formed from, for example, a photodiode, although not limited to this. The light-receiving unit 3001 is detachably mounted in the holding hole 120c of the turret 120b. The light-receiving unit 3001 can therefore be placed on the observation optical axis OA1 as needed. In other words, the turret 120b constitutes a moving mechanism that places the light-receiving unit 3001 on the observation optical axis OA1 of the microscope as needed.

The illumination intensity measuring device also comprises a converter 3003 that converts the signal output from the light-receiving unit 3001 into light intensity information. The converter 3003 is connected to the light-receiving unit 3001 through a cable 3002. The converter 3003 converts the signal output from the light-receiving unit 3001 into light intensity information. The converter 3003 comprises a wavelength selection unit 3004 of, for example, a dial type, which is used to set a wavelength for light to be measured, and a display unit 3005 for displaying a light intensity.

The function of the illumination intensity measuring device according to this embodiment will be described next.

In normal fluorescent observation, as described above, excitation light is applied from an objective lens 105 to a living cell 103, thereby allowing fluorescent observation.

When an excitation light intensity in this state is to be measured, first of all, an excitation wavelength to be used is set by the wavelength selection unit 3004. A stage 102 is then operated to place a position where the living cell 103 does not exist on the observation optical axis OA1. The turret 120b is operated to place the light-receiving unit 3001 on the observation optical axis OA1.

As a consequence, the excitation light strikes the light-receiving unit 3001. The light-receiving unit 3001 outputs an analog signal representing the intensity of the received excitation light. The analog signal is guided to the converter 3003 through the cable 3002. The converter 3003 calculates a light intensity by processing the analog signal on the basis of the wavelength selected by the wavelength selection unit 3004, and displays the calculation result on the display unit 3005.

This allows the observer to obtain the same merits as those of the first embodiment.

As shown in FIG. 5, in the third embodiment, the light-receiving unit 3001 is held on the turret 120b of the condenser 120 such that the light-receiving unit 3001 can be placed on the observation optical axis OA1. However, a similar effect can be obtained by the following arrangement and function.

The condenser 120 may be replaced with a reflecting member such as a mirror (not shown) placed on the observation optical axis OA1 at an angle of 45° with respect to the observation optical axis OA1 and a dedicated condenser 120 that has the light-receiving unit 3001 placed at a position where it can receive excitation light that is reflected by the reflecting member and is perpendicular to the observation optical axis OA1.

In this case, the excitation light reflected by the reflecting member placed on the observation optical axis OA1 strikes the light-receiving unit 3001, and the excitation light intensity can be displayed on the display unit 3005.

In this case, the angle of the reflecting member with respect to the observation optical axis OA1 is set to 45°. However, a similar effect can be obtained even if this angle is changed.

Modifications of the third embodiment will be described below.

Since the modifications are basically the same as the first embodiment, they will be described without using any drawing.

(First Modification)

As in the first modification of the first embodiment, a light control device is combined with the illumination intensity measuring device. This makes it possible to obtain the same effects as those of the first modification of the first embodiment.

(Second Modification)

In the device arrangement of the first modification of this embodiment, the turret 120b is formed from a motor-driven turret, and the operation of the turret 120b is controlled by software in a PC. This makes it possible to obtain the same effects as those of the second modification of the first embodiment.

The embodiments of the present invention have been described above with reference to the views of the accompanying drawing. However, the present invention is not limited to these embodiments, and may be variously changed or modified within the spirit and scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope illumination intensity measuring device, which measures an illumination light intensity of an illumination optical system of a microscope, comprising:
    a light-receiving unit that outputs a signal representing an intensity of received light;
    a moving mechanism that exchangeably places a specimen to be observed and the light-receiving unit on an observation optical axis of the microscope;
    a converter that converts a signal output from the light-receiving unit into light intensity information; and
    a display unit that displays the light intensity information.

2. A device according to claim 1, wherein the moving mechanism comprises a stage which is operable to move the specimen, which is supported on the stage, in a plane perpendicular to the observation optical axis, and the light-receiving unit is disposed on the stage.

3. A device according to claim 2, wherein the illumination optical system of the microscope includes a motor-driven light control device, and the microscope illumination intensity measuring device further comprises a light control unit that controls the light control device based on the light intensity information obtained by the converter, and a light intensity setting unit that sets a target value for the light intensity.

4. A device according to claim 3, wherein the microscope comprises a PC-controlled microscope which is controlled by software in a PC, the microscope illumination intensity measuring device includes the PC, and the light intensity setting unit is provided by the software in the PC.

5. A device according to claim 4, wherein the stage comprises a motor-driven stage which is controlled by the software in the PC.

6. A device according to claim 2, wherein the stage is moved so that the light-receiving unit is located at a position to which light from the illumination optical system is applied, to measure the illumination light intensity in an observed state.

7. A device according to claim 1, wherein at least one of the converter and the display unit is provided on a PC.

8. A device according to claim 1, further comprising a wavelength selection unit that sets a wavelength for light to be measured.

9. A device according to claim 8, wherein at least one of the converter, wavelength selection unit, and the display unit is provided on a PC.

10. A microscope illumination intensity measuring device, which measures an illumination light intensity of an illumination optical system of a microscope, comprising:
    a light-receiving unit that outputs a signal representing an intensity of received light;
    a stage that exchangeably places a specimen to be observed and the light-receiving unit at a position to which light from the illumination optical system of the microscope is applied;
    a converter that converts a signal output from the light-receiving unit into light intensity information; and
    a display unit that displays the light intensity information;
    wherein the stage is moved so that the light-receiving unit is located at the position to which the light from the illumination optical system is applied, to measure the illumination light intensity in an observed state.

11. A device according to claim 10, wherein the light-receiving unit is mounted on the stage, and the stage is movable in a plane perpendicular to an observation optical axis of the microscope.

12. A device according to claim 10, further comprising a wavelength selection unit that sets a wavelength for light to be measured.

* * * * *